US012478057B2

(12) United States Patent
McClelland

(10) Patent No.: US 12,478,057 B2
(45) Date of Patent: Nov. 25, 2025

(54) HARVEST WEED MAPPING

(71) Applicant: CNH Industrial America LLC, New Holland, PA (US)

(72) Inventor: Brett McClelland, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 179 days.

(21) Appl. No.: 18/078,557

(22) Filed: Dec. 9, 2022

(65) Prior Publication Data

US 2024/0188474 A1 Jun. 13, 2024

(51) Int. Cl.
*A01M 7/00* (2006.01)
*A01D 43/14* (2006.01)
*G05B 13/02* (2006.01)

(52) U.S. Cl.
CPC ........... *A01M 7/0089* (2013.01); *A01D 43/14* (2013.01); *G05B 13/0265* (2013.01)

(58) Field of Classification Search
CPC .... A01D 43/14; A01B 69/001; A01B 69/004; A01B 39/06; A01B 79/005; A01M 7/0089; A01M 21/043; G06V 20/188; G06V 20/68; B64U 2101/45; B64D 1/18
See application file for complete search history.

(56) References Cited

U.S. PATENT DOCUMENTS

| 9,737,068 | B1 | 8/2017 | Lytle |
| 11,147,257 | B2 | 10/2021 | Warren et al. |
| 11,375,707 | B1 | 7/2022 | Guice et al. |
| 2017/0118925 | A1* | 5/2017 | Noguchi ............... G01J 3/0278 |
| 2017/0258005 | A1* | 9/2017 | Cutter .................. A01C 21/005 |
| 2021/0182978 | A1 | 6/2021 | Nissing |
| 2021/0321555 | A1* | 10/2021 | Pickett .................... H04N 23/11 |
| 2022/0071192 | A1 | 3/2022 | Benoit-Levy et al. |
| 2022/0076014 | A1 | 3/2022 | Ito |
| 2022/0117217 | A1 | 4/2022 | Wurden |
| 2022/0132748 | A1* | 5/2022 | Vild ........................ G16B 40/30 47/1.7 |
| 2022/0167605 | A1 | 6/2022 | Janssen et al. |

(Continued)

FOREIGN PATENT DOCUMENTS

GR 1009533 5/2019

OTHER PUBLICATIONS

Ahmed et al., "A Real-Time Specific Weed Recognition System Using Statistical Methods," World Academy of Science, Engineering and Technology International Journal of Computer, Information, Systems and Control Engineering vol. 1 No:10, 2007.

(Continued)

*Primary Examiner* — Khoi H Tran
*Assistant Examiner* — Tanner L Cullen
(74) *Attorney, Agent, or Firm* — Foley & Lardner LLP

(57) ABSTRACT

A system and a method for controlling an agricultural vehicle includes receiving sensor information for an agricultural vehicle from one or more sensors, determining the quality of an agricultural application based on the sensor information, updating a vehicle control learning algorithm for controlling the agricultural vehicle based on the determined quality of the agricultural application, and controlling an operation of the agricultural vehicle based on the updated vehicle control learning algorithm.

20 Claims, 6 Drawing Sheets

(56) References Cited

U.S. PATENT DOCUMENTS

| | | |
|---|---|---|
| 2022/0183208 A1 | 6/2022 | Sibley et al. |
| 2022/0183267 A1 | 6/2022 | Janssen et al. |
| 2022/0225604 A1 | 7/2022 | Harmon |
| 2022/0264861 A1 | 8/2022 | Bast et al. |
| 2023/0217914 A1* | 7/2023 | Centola ............ G06Q 50/02 705/7.26 |

OTHER PUBLICATIONS

Kim et al., "An Image Segmentation Technique with Statistical Strategies for Pesticide Efficacy Assessment," Public Library of Science, Mar. 2021.

Partel et al., "Development and Evaluation of a Low-Cost and Smart Technology for Precision Weed Management Utilizing Artificial Intelligence," Computers and Electronics in Agriculture 157 (2019) 339-350.

European Search Report and Written Opinion dated Apr. 23, 2024 for related European Application No. 23215600.0 (12 pages).

\* cited by examiner

HARVEST WEED MAPPING

BACKGROUND

The present disclosure relates generally to vehicle controls for industrial vehicles such as agricultural vehicles or construction vehicles. More specifically, the present disclosure relates to dynamically updating the guidance controls for a vehicle based on changes to the vehicle.

SUMMARY

One embodiment relates to a method. The method includes: receiving sensor information for an agricultural vehicle from one or more sensors, determining the quality of an agricultural application based on the sensor information, updating a vehicle control learning algorithm for controlling the agricultural vehicle based on the determined quality of the agricultural application, and controlling an operation of the agricultural vehicle based on the updated vehicle control learning algorithm.

In one embodiment, wherein the one or more sensors includes an object identification sensor. In one embodiment, the object identification sensor comprises an object identification software which is configured to determine the identification of one or more plants in an agricultural field. In one embodiment, the agricultural application is an herbicide application. In such an embodiment, determining the quality of the herbicide application includes identifying, by the object identification sensor, one or more plants in an agricultural field, categorizing the one or more plants as either a crop or a non-crop, and generating an efficacy rate of the herbicide application based on a ratio of the one or more plants categorized as a crop and the one or more crops categorized as a non-crop.

In one embodiment, the agricultural application is a pesticide application. In such an embodiment, determining the quality of the pesticide application includes identifying, by the object identification sensor, one or more plants in an agricultural field, categorizing the one or more plants as either infected or not infected, and generating an efficacy rate of the pesticide application based on the ratio of the plants categorized as infected and the plants categorized as not infected. In one embodiment the vehicle control learning algorithm is at least one of an artificial intelligence algorithm, a reinforcement learning algorithm, and a machine learning algorithm. In one embodiment, the one or more sensors is at least one of a camera, a radar sensor, and a radio frequency identification sensor.

Another embodiment of the present disclosure is a non-transitory computer readable media comprising computer-readable instructions stored thereon that when executed by a processor causes the processor to receive sensor information for an agricultural vehicle from one or more sensors, determine the quality of an agricultural application based on the sensor information, update a vehicle control learning algorithm for controlling the agricultural vehicle based on the determined quality of the agricultural application, and control an operation of the agricultural vehicle based on the updated vehicle control learning algorithm.

In one embodiment, the processor further executes the computer-readable instructions to identify, by the object identification sensor, one or more plants in an agricultural field, categorize the one or more plants as either a crop or a non-crop, generate an efficacy rate of the herbicide application based on a ratio of the one or more plants categorized as a crop and the one or more crops categorized as a non-crop, and determine the quality of the pesticide application based the efficacy rate. In one embodiment, the processor further executes the computer-readable instructions to identify, by the object identification sensor, one or more plants in an agricultural field, categorize the one or more plants as either a crop or a non-crop, generate an efficacy rate of the herbicide application based on a ratio of the one or more plants categorized as a crop and the one or more crops categorized as a non-crop, and determine the quality of the herbicide application based the efficacy rate.

Still another embodiment relates to a vehicle control system. The vehicle control system includes an agricultural vehicle, an implement coupled to the agricultural vehicle, and a controller. The controller includes one or more processing circuits, each processing circuit including a processor and a memory, the memory having instructions stored thereon that, when executed by the processor, cause the processing circuit to receive sensor information for an agricultural vehicle from one or more sensors, determine the quality of an agricultural application based on the sensor information, update a vehicle control learning algorithm for controlling the agricultural vehicle based on the determined quality of the agricultural application, and control an operation of the agricultural vehicle based on the updated vehicle control learning algorithm.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Industrial vehicles such as agricultural vehicles (e.g., tractors, tillers, planters, sprayers, combines, and fertilizers, etc.) may be utilized in agricultural applications to facilitate the growing of crops and any other type of agricultural application. The present disclosure is directed towards system and methods for controlling the operation of an agricultural vehicle. In some embodiments, agricultural vehicles may include one or more vehicle control systems which are configured to control the operation of the vehicle. In some embodiments, the vehicle control system may include an assessment circuit which may be configured to receive sensor information from the vehicle and determine the quality of the agricultural application based on the sensor information. Further, the assessment circuit may include a vehicle control learning algorithm which is configured to ingest the sensor data, measure the quality of the agricultural application based on the sensor data, update the vehicle control learning algorithm, and control operation of the vehicle based on the updated vehicle control learning algorithm.

Typical agricultural vehicles do not include such analysis which may lead to inefficient and/or faulty operation of the agricultural vehicle. However, the systems and methods described herein provide an improved agricultural vehicle which operates more efficiently and with less errors because the vehicle control system continuously and dynamically controls the operation of the agricultural vehicle based on the updated vehicle control learning algorithm.

For the purposes of the present disclosure, the term "vehicle" refers to any equipment that can be moved (e.g., within a field), regardless of whether the equipment includes a prime mover or other device configured to move the equipment under its own power. For example, the term "vehicle" applies to powered equipment such as a tractor, combine, harvester, etc., but the term "vehicle" also applies to equipment that moves through the assistance of another vehicle, such as various agricultural or construction implements that are attached/coupled to another vehicle (e.g., implements such as irrigation machinery, soil cultivation implements, planting equipment, harvesting implements, etc. that are attached to and moved by a tractor or other vehicle). Though agricultural vehicles are primarily described in the present disclosure, the systems and methods herein may be applied in a variety of industrial applications including construction.

Figure 1:
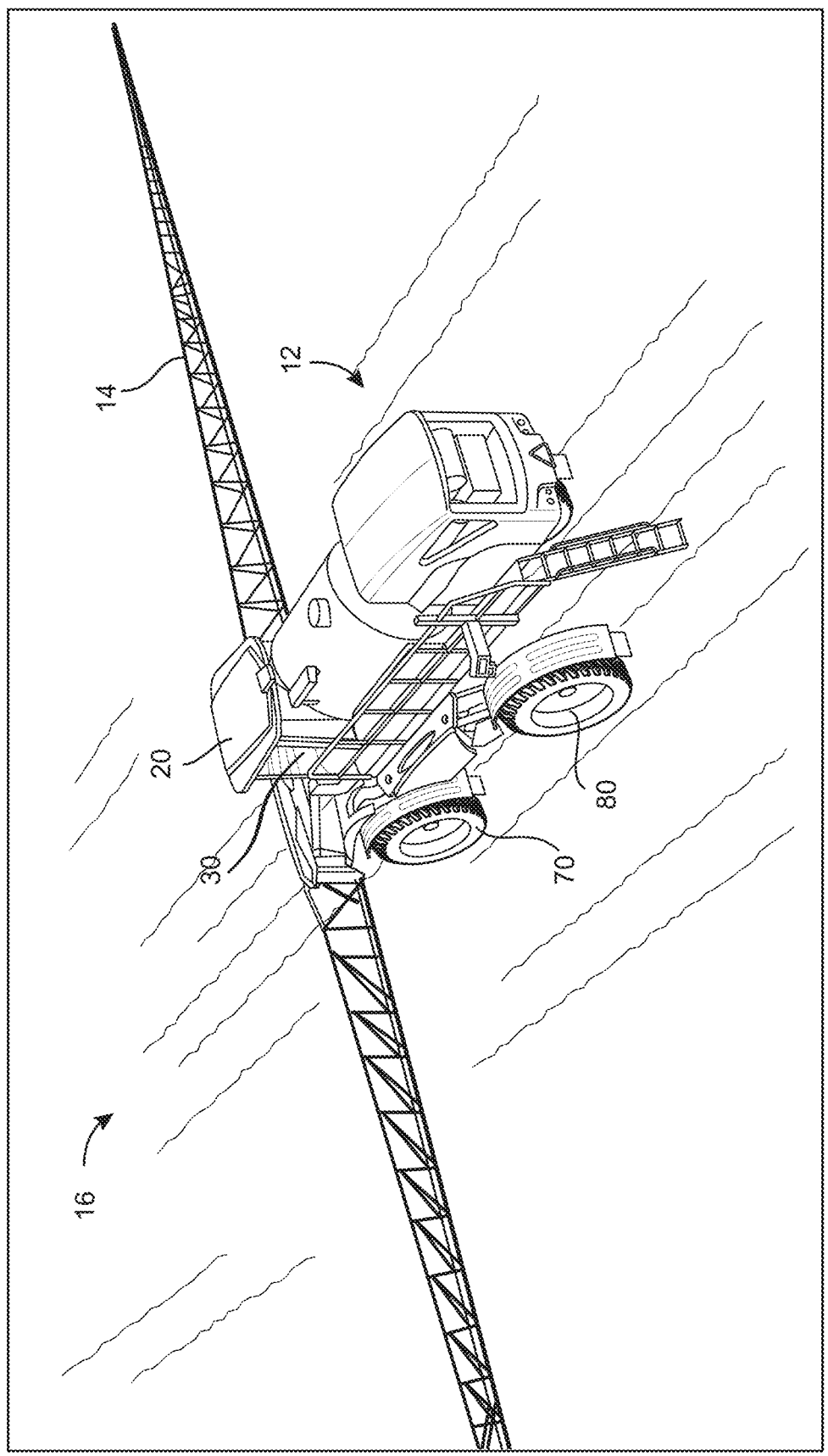
FIG. 1 is a perspective view of a vehicle, according to an exemplary embodiment.
Figure 3:
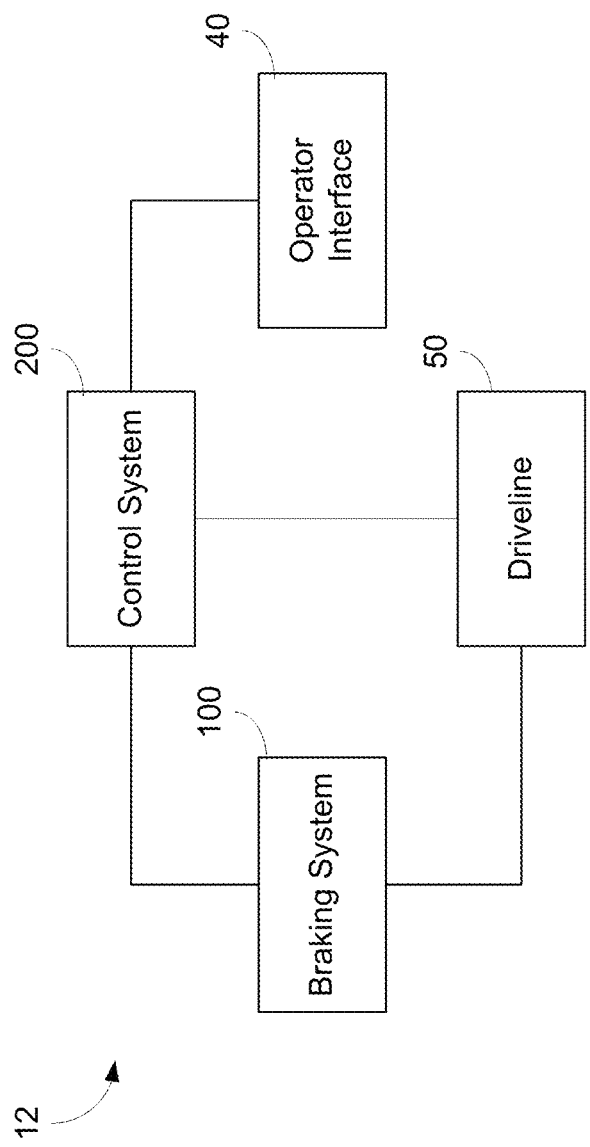
FIG. 3 is a schematic block diagram of the vehicle of FIG. 1, according to an exemplary embodiment

According to the exemplary embodiment shown in FIG. 1, a machine or vehicle, shown as vehicle 12, a body assembly, shown as body 20, coupled to a vehicle frame and having an occupant portion or section, shown as cab 30. The cab 30 may include one or more operator input and output devices that are disposed within the cab 30. The operator input and output devices may include a steering wheel, a gear shift, and/or a display screen. The vehicle 12 may be propelled by a drivetrain 50, which is described in more detail with respect to FIG. 4. In some embodiments, as shown in FIG. 3, the vehicle 12 may also include a vehicle braking system 100, coupled to one or more components of the driveline 50 to facilitate selectively braking the one or more components of the driveline 50. The vehicle 12 also includes a vehicle control system, shown as control system 200, coupled to the operator interface 40, the driveline 50, and the braking system 100. In other embodiments, the vehicle 10 includes more or fewer components. In the exemplary embodiment shown in FIG. 1, the vehicle 12 is an agricultural vehicle with a sprayer implement 14 that is structured to distribute a product within an agricultural area 16. In some embodiments, the vehicle 12 may include a sprayer boom (not pictured) which is configured to apply the product.

Figure 2:
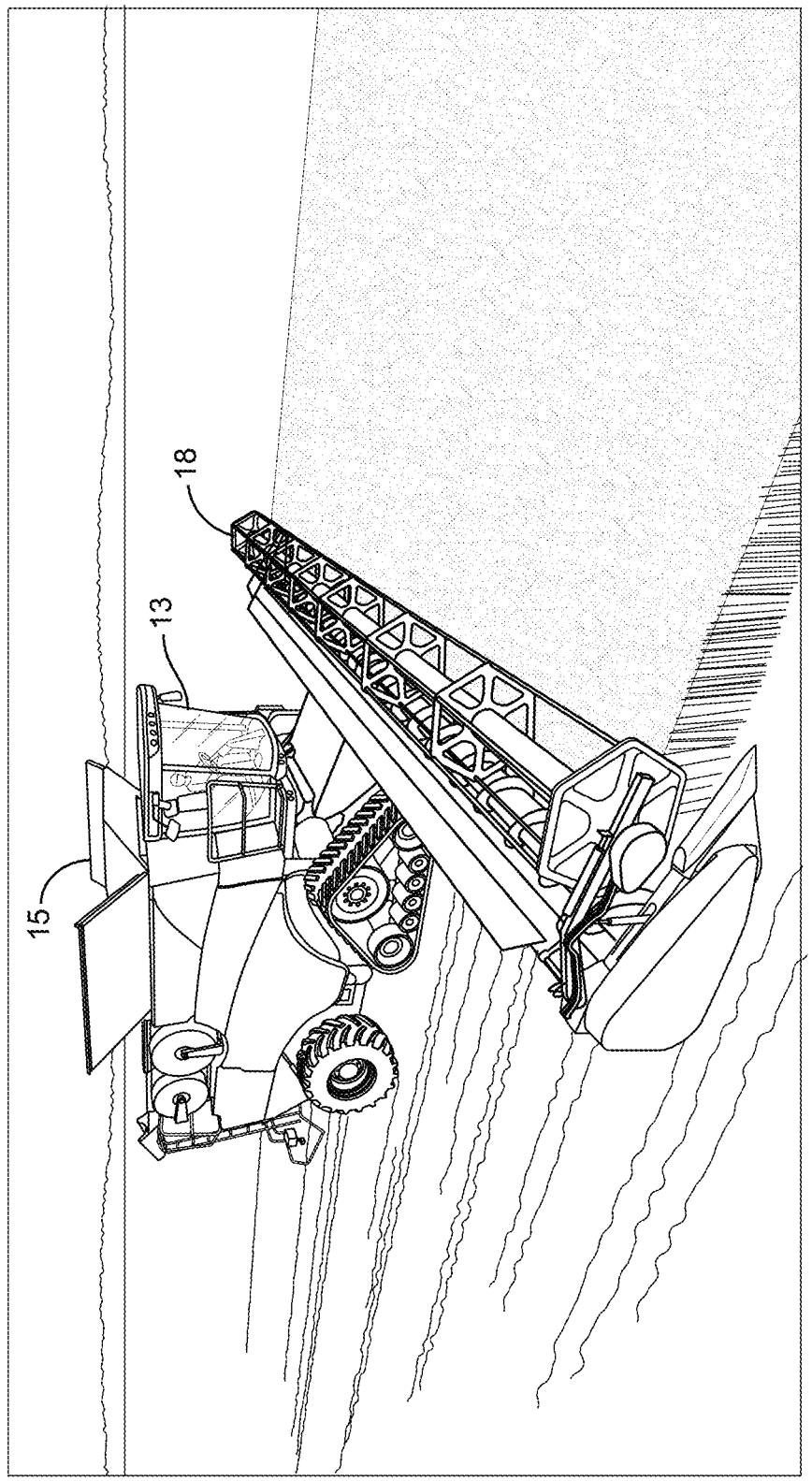
FIG. 2 is a perspective view of another vehicle, according to an exemplary embodiment.

According to the exemplary embodiment shown in FIG. 2, another machine or vehicle, shown as vehicle 13 is shown. In some embodiments, the vehicle 13 may include some or all of the elements of the vehicle 12 as described herein. In some embodiments, the vehicle 13 may be configured to harvest a crop. The vehicle 13 may include a combine 18 and a storage tank 15. Specifically, the vehicle 13 may be electrically and mechanically coupled to the combine 18 which is configured to detach a crop from a field to harvest the crop. The harvested crop may be configured to travel through the combine 18, up through the vehicle 13, till the harvested crop reaches the storage tank 15 where the harvested crop is stored.

It should be understood that the vehicle 12 shown in FIG. 1 and the vehicle 13 shown in FIG. 2 are merely examples, and the features of the present disclosure can be used with any type of vehicle (e.g., any type of industrial vehicle, such as an agricultural or construction vehicle) in various example embodiments. According to an exemplary embodiment, the vehicle 12 and vehicle 13 are an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 12 and/or the vehicle 13 may include one or more attached implements and/or trailed implements such as a combine, a sprayer, a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 12. In some embodiments, the cab 30 is configured to provide seating for one or more passengers of the vehicle 12. According to an exemplary embodiment, the operator interface 40 is configured to provide an operator with the ability to control one or more functions of and/or provide commands to the vehicle 12 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

Figure 4:
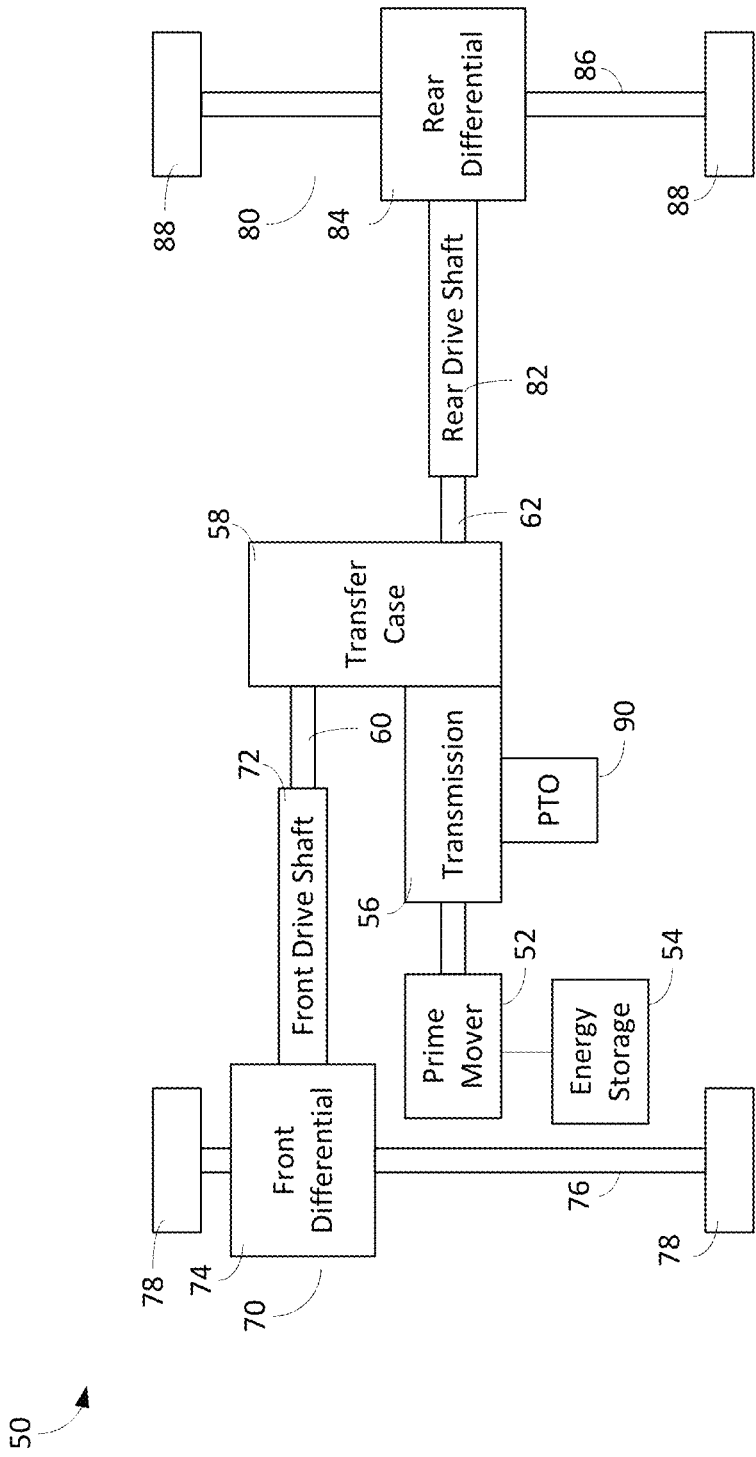
FIG. 4 is a schematic block diagram of the vehicle of FIG. 1, according to an exemplary embodiment.

According to an exemplary embodiment, the driveline 50 is configured to propel the vehicle 10. As shown in FIG. 4, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 4, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIG. 4, a front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIG. 4, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. According to the exemplary embodiment shown in FIG. 2, the front tractive elements 78 are structured as tracks while the rear tractive elements 88 are structured as wheels. In other embodiments, the front tractive elements 78 and the rear tractive elements 88 are otherwise structured. In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Figure 5:
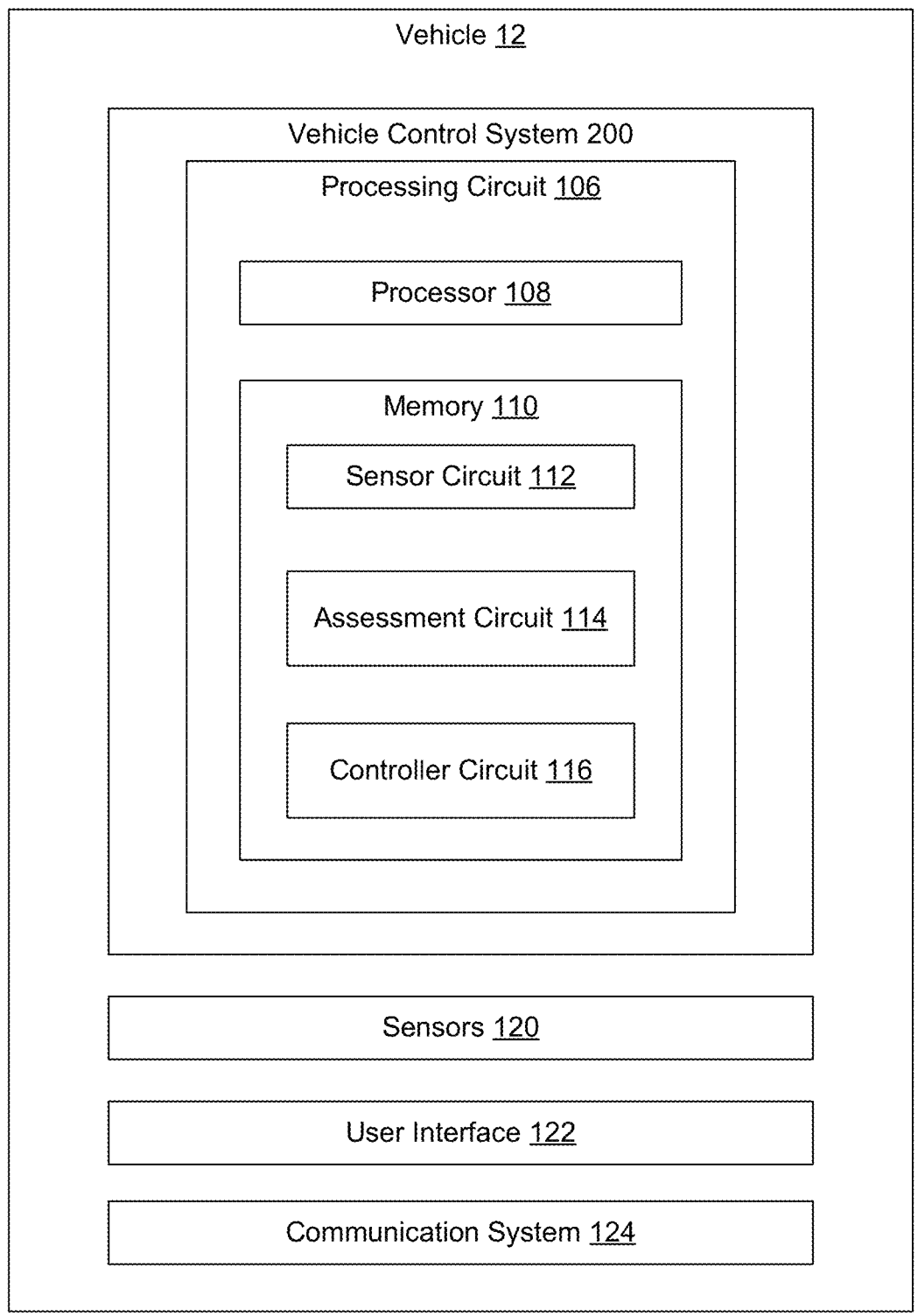
FIG. 5 is a schematic block diagram of a vehicle control system for controlling the vehicle of FIG. 1 and the vehicle of FIG. 2, according to an exemplary embodiment.

Referring now to FIG. 5, a schematic diagram of an agricultural vehicle 12 with a vehicle control system 200 is shown according to an exemplary embodiment. The agricultural vehicle 12 may be similar to vehicle 13 which are described in more detail above. Further, the vehicle control actions described below are described with reference to vehicle 12. However, this disclosure is only meant to exemplary and may additionally or alternatively be applied to vehicle 13. The agricultural vehicle 12 includes vehicle control system 200, sensor(s) 120, user interface 122, and communication system 124. Vehicle control system 200 may control operation of the agricultural vehicle based on a vehicle control learning algorithm. In some embodiments, the vehicle control algorithm may be an artificial intelligence algorithm. In some embodiments, the vehicle control algorithm may be a reinforcement learning algorithm. In some embodiments, the vehicle control algorithm may be a machine learning algorithm. In various embodiments, the vehicle control system 200 is physically located with the agricultural vehicle 12. For example, the vehicle control system 200 may be or include a hardware component installed in or on the agricultural vehicle 12. Additionally or alternatively, part or all of the vehicle control system 200 may be located separately from the agricultural vehicle 12. For example, in some implementations, portions of the vehicle control system 200 may be implemented within a remote processing system (e.g., a server, two or more computing systems/servers in a distributed computing implementation, a cloud-based processing system, etc.) configured to receive input from a remote data source and generate data and/or control first the agricultural vehicle 10 remotely.

The sensor(s) 120 may monitor one or more parameters associated with the agricultural vehicle 12. In some embodiments, the sensor(s) 120 may include an object identification sensor mounted on the agricultural vehicle 12 which is configured to determine the identity of an object in the agricultural vehicle's path. For example, the object identification sensor may determine the identity of various plants within an agricultural field. More specifically, the object identification sensor may be a combination of a multiple sensors (e.g., camera, light grid sensor, photoelectric sensors, etc.) and object detection software which may be configured to identify different types of plants which may be found in an agricultural field (e.g., crops, weeds, etc.). As another example, the sensor(s) 120 may monitor operation of the prime mover 52 (e.g., torque, temperature, fuel level, airflow, etc.). Additionally or alternatively, sensor(s) 120 may monitor an environment of the agricultural vehicle 12. Additionally, the sensor(s) 120 may monitor the status of one or more implements attached to the agricultural vehicle. For example, the sensor(s) 120 may include a motion sensor which may be used to determine whether parts or the entire implement is in use. As another example, a fluid flow sensor may be used within a sprayer implement to determine the amount of fluid being sprayed through the sprayer. Information received from the sensor(s) 120 may be used, either alone or in combination, to determine an operation mode and machine state of the agricultural vehicle. The sensor(s) 120 may include engine sensors, transmission sensors, chassis sensors, safety sensors, driver assistance sensors, passenger comfort sensors, entertainment systems sensors, and/or the like. In some embodiments, the sensor(s) 120 may receive input from external sources. For example, the sensor(s) 120 may include position sensors configured to communicate with one or more beacons located throughout a farm field to determine a location of the agricultural vehicle 12. In various embodiments, the sensor(s) 120 are physically located on or in the agricultural vehicle 12. For example, the sensor(s) 120 may include a chassis mounted infra-red sensor configured to measure crop health. Additionally or alternatively, sensor(s) 120 may be located separately of the agricultural vehicle 12. In some embodiments, the sensor(s) 120 may include hardware and/or software components. For example, the sensor(s) 120 may include a GPS receiver configured to receive positional data and a software component configured to determine positional parameters associated with the agricultural vehicle 12 (e.g., pose, speed, yaw, trajectory, etc.) based on the positional data. As another example, sensor(s) 120 may include an optical device (e.g., a camera, LIDAR sensor, etc.) configured to capture image data.

The user interface 122 may facilitate user interaction with the agricultural vehicle 12. The user interface 122 may include elements configured to present information to a user and receive user input. For example, the user interface 122 may include a display device (e.g., a graphical display, a touchscreen, etc.), an audio device (e.g., a speaker, etc.), manual controls (e.g., manual steering control, manual transmission control, manual braking control, etc.), and/or the like. The user interface 122 may include hardware and/or software components. For example, the user interface 122 may include a microphone configured to receive user voice input and a software component configured to control the agricultural vehicle 12 based on the received user voice input. In various embodiments, the user interface 122 presents information associated with the operation of the agricultural vehicle 12 to a user and facilitates user control of operating parameters. For example, the user interface 122 may display operational parameters (e.g., fuel level, seed level, penetration depth of ground engaging tools, guidance swath, etc.) on a touchscreen display and receive user control input via the touchscreen display.

The communication system 124 may facilitate communication between the agricultural vehicle 12 and/or vehicle control system 200 and external systems (e.g., a remote database, etc.). The communication system 124 may be or include wired or wireless communications interfaces (e.g., jacks, antennas, transmitters, receivers, transceivers, wire terminals, etc.) for conducting data communications with other external systems or devices. In various embodiments, communications via communication system 124 is direct (e.g., local wired or wireless communications). Additionally or alternatively, communications via the communication system 124 may utilize a network (e.g., a WAN, the Internet, a cellular network, a vehicle-to-vehicle network, etc.). For example, vehicle control system 200 may communicate with a decision support system (DSS) using a 4G and/or 5G connection (e.g., via a 4G or 5G access point/small cell base station, etc.) and may communicate with second vehicle 20 using a dedicated short-range communication channel (e.g., a vehicular ad-hoc network, etc.). In some embodiments, communication system 124 facilitates vehicle-to-vehicle (V2V) and/or vehicle-to-everything (V2X) communication. For example, communication system 124 may facilitate communication between multiple agricultural vehicles using the IEEE 802.11p standard (e.g., a wireless access in vehicular environments (WAVE) vehicular communication system) and/or Wi-Fi.

In some embodiments, the vehicle control system 200 includes a processing circuit 106 having a processor 108 and a memory 110. In some embodiments, vehicle control system 200 includes one or more processing circuits 106 including one or more processors 108 and one or more memories 110. Each of the processors 108 can be a general purpose or specific purpose processor, an application specific integrated circuit (ASIC), one or more field programmable gate arrays (FPGAs), a group of processing components, or other suitable processing components. Each of the processors 108 is configured to execute computer code or instructions stored in the memory 110 or received from other computer readable media (e.g., CDROM, network storage, a remote server, etc.).

In some embodiments, the memory 110 may include one or more devices (e.g., memory units, memory devices, storage devices, or other computer-readable media) for storing data and/or computer code for completing and/or facilitating the various processes described in the present disclosure. The memory 110 may include random access memory (RAM), read-only memory (ROM), hard drive storage, temporary storage, non-volatile memory, flash memory, optical memory, or any other suitable memory for storing software objects and/or computer instructions. The memory 110 may include database components, object code components, script components, or any other type of information structure for supporting the various activities and information structures described in the present disclosure. The memory 110 may be communicably connected to the processor(s) 108 via the processing circuit 106 and may include computer code for executing (e.g., by processor 108) one or more of the processes described herein.

In some embodiments, the memory 110 is shown to include a sensor circuit 112, an assessment circuit 114, and a controller circuit 116. In some embodiments, the sensor circuit 112 is configured to receive sensor information about the agricultural vehicle 12. For example, the sensor circuit 112 may be coupled to an objection identification sensor mounted on an agricultural vehicle which is configured to provide information about one or more plants identified within an agricultural field.

In some embodiments, the assessment circuit 114 is configured to receive the vehicle information from the sensor circuit 112 and use that information to determine a quality of an agricultural application based on the sensor information. For example, in some embodiments, the assessment circuit 114 may be configured to receive information about the plants present within an agricultural field. In some embodiments, an agricultural application may include applying herbicide to an agricultural field to prevent the growth of weeds. In other embodiments, the agricultural application may include applying pesticides to an agricultural field to prevent crop degradation due to harmful insects and organisms. In some embodiments, the agricultural application may include harvesting a crop growing in an agricultural field. The assessment circuit 114 may determine the quality of an agricultural application by evaluating sensor data to determine the efficacy of the agricultural application. For example, based on the sensor information received from the object identification sensor, the assessment circuit 114 may determine the efficacy of the herbicide application by determining the amount of weeds found in an agricultural field. As another example, based on the sensor information received from the object identification sensor, the assessment circuit 114 may determine the efficacy of the pesticide application by determining the amount of damaged crops due to harmful pests and organisms within an agricultural field. As a final example, based on the sensor information received from the object identification sensor or a level or weigh sensor, the assessment circuit 114 may determine the efficacy of a harvesting application by determining the amount crop not harvested after running a harvesting combine through an agricultural field.

In some embodiments, the assessment circuit 114 may include a vehicle control learning algorithm which is configured to ingest information about the agricultural vehicle and update itself based on the information. Specifically, the vehicle control learning algorithm may receive the quality of the agricultural application as determined by the assessment circuit 114 and updates based on the determined quality. For example, if the assessment circuit 114 determines an efficacy of an agricultural application is below a certain threshold (e.g., 90%, 80%, 70%, etc.), then the vehicle control learning algorithm may be updated to correct for a lower than desired agricultural application efficacy. In some embodiments, the vehicle control learning algorithm may specify that an efficacy for certain agricultural applications below a certain threshold corresponds to certain updates to the vehicle control learning algorithm. For example, if the efficacy of herbicide agricultural application is below a certain threshold, the vehicle control algorithm may be updated to command the agricultural vehicle to change the operation of a sprayer or the agricultural vehicle (e.g., increase sprayer pressure, increase the amount of chemicals dispelled by the sprayer, change one or more motion characteristics of the agricultural vehicle).

The controller circuit 116 may facilitate control of the vehicle 12 by determining control inputs structured to guide operation of the vehicle 12. Specifically, the controller circuit 116 may facilitate controlling operation of the vehicle 12 based on the updated vehicle control learning algorithm. In some embodiments, the controller circuit 116 may facilitate autonomous and/or semi-autonomous operation of the vehicle 12. In some implementations, the controller circuit 116 may provide information (e.g., warnings, alerts, data, etc.) to a user/operator of the vehicle 12 for use in manually controlling the vehicle 12.

Figure 6:
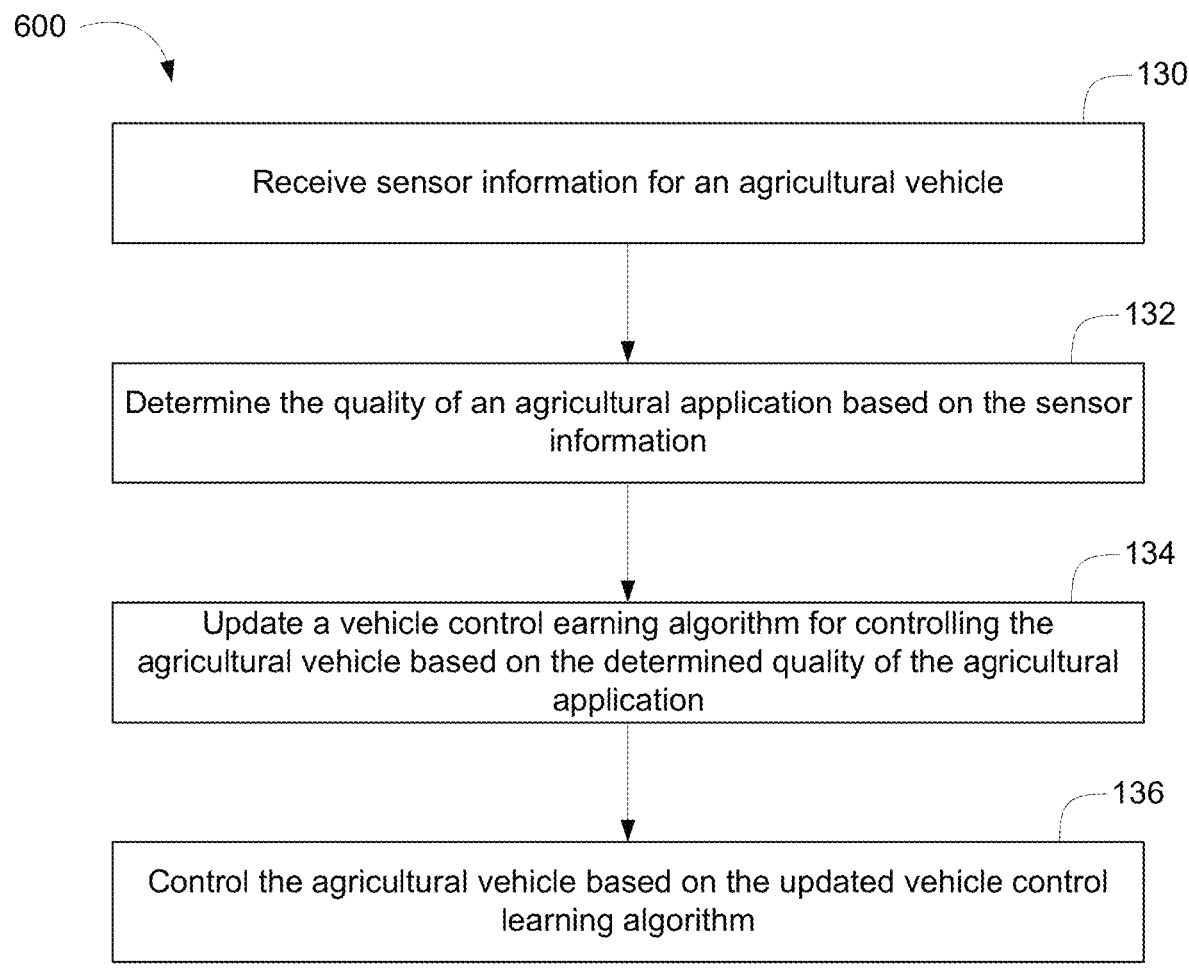
FIG. 6 is a flow diagram of a method for controlling the vehicles of FIG. 1 and FIG. 2, according to an exemplary embodiment.

Referring now to FIG. 6, a method 600 for controlling the operation of the vehicle 12 (or vehicle 13) based on the vehicle control system 200 utilizing the vehicle control learning algorithm is shown, according to an exemplary embodiment. In some embodiments, the method 600 may be executed by the vehicle control system 200. More specifically, the method 600 may be executed by the vehicle control system 200.

At step 130, the vehicle control system 200 may receive sensor information for an agricultural vehicle, in some embodiments. As explained above, the vehicle control system 200 includes the sensor circuit 112 which is communicably coupled to one or more sensors 120 associated with the agricultural vehicle 12. The sensor circuit 112 may be structured to receive, aggregate, and store sensor information about the agricultural vehicle 12. In some embodiments, the sensor information may include data from an object detection sensor or any other type of sensor associated with the vehicle (e.g., volume sensor, mass sensor, or level sensor which may be aggregated and converted to determine the amount of product (e.g., sprayer fluid, harvested crop, etc.). Please note that the sensor information described herein is only exemplary and not meant to be limiting.

At step 132, the vehicle control system 200 may determine the quality of an agricultural application based on the sensor information. As described above, the quality of an agricultural application describes how successfully an agricultural application has been completed and may be described in terms of agricultural application efficacy. Specifically, the assessment circuit 114 within the vehicle control system 200 may receive data from the sensor circuit 112 and determine an efficacy rate for an agricultural application based on the sensor information.

At step 134, the vehicle control system 200 may update the vehicle control learning algorithm for controlling the agricultural vehicle based on the determined quality of the agricultural application. Specifically, the vehicle control learning algorithm utilizes the quality of the agricultural application as determined by the assessment circuit 114 and updates based on the determined quality. For example, if the vehicle control system 200 determines that an efficacy of an agricultural application is below a certain threshold, then the vehicle control learning algorithm may be updated to correct for this.

At step 136, the vehicle control system 200 may control the agricultural vehicle 12 based on the updated vehicle control learning algorithm. In some embodiments, the vehicle control system 200 also controls the operation of an implement attached to the agricultural vehicle 12 based on the updated vehicle control learning algorithm. In some embodiments, the vehicle control system 200 controls the agricultural vehicle by controlling the positioning of the agricultural vehicle 12 and/or an implement attached to the vehicle. For example, if the vehicle control learning algorithm is updated to correct for an herbicide application lower than a certain efficacy rate, the vehicle control system 200 may control the sprayer implement to increase the amount of chemical dispelled from the sprayer to increase the efficacy rate. As another example, if the vehicle control learning algorithm is updated to correct for a harvesting application lower than a certain efficacy rate, the vehicle control system 200 may control a motion characteristic of the vehicle to increase the amount of available crop harvested.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 10 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

What is claimed is:

1. A method comprising:
   receiving, by one or more processors from one or more sensors, sensor information for an agricultural vehicle, the sensor information associated with one or more plants in an agricultural field;
   determining, by the one or more processors, a quality of an agricultural application based on the sensor information by:
      identifying, by the one or more processors, the one or more plants in the agricultural field and a damage amount of the identified one or more plants;
      categorizing, by the one or more processors, the one or more plants as infected or not infected based at least in part on the identified damage amount; and
      generating, by the one or more processors, an efficacy rate of the agricultural application based on a ratio of the one or more plants categorized as infected and not infected;
   updating a vehicle control learning algorithm for controlling the agricultural vehicle based on the determined quality of the agricultural application; and
   controlling an operation of the agricultural vehicle based on the updated vehicle control learning algorithm.

2. The method of claim 1, wherein the one or more sensors includes an object identification sensor.

3. The method of claim 2, wherein the object identification sensor comprises an object identification software which is configured to determine an identification of the one or more plants in the agricultural field.

4. The method of claim 3, wherein the agricultural application is an herbicide application and wherein determining the quality of the herbicide application further comprises:
   categorizing the one or more plants as either a crop or a non-crop; and
   generating an herbicide efficacy rate of the herbicide application based on a second ratio of the one or more plants categorized as the crop and the one or more plants categorized as the non-crop.

5. The method of claim 3, wherein the agricultural application is a pesticide application.

6. The method of claim 1, wherein the vehicle control learning algorithm is at least one of an artificial intelligence algorithm, a reinforcement learning algorithm, and a machine learning algorithm.

7. The method of claim 1, wherein the one or more sensors is at least one of a camera, a radar sensor, and a radio frequency identification sensor.

8. A non-transitory computer-readable media comprising computer-readable instructions stored thereon that when executed by a processor causes the processor to:
receive sensor information for an agricultural vehicle from one or more sensors, the sensor information associated with one or more plants in an agricultural field;
determine a quality of an agricultural application based on the sensor information by:
identifying the one or more plants in the agricultural field and a damage amount of the identified one or more plants;
categorizing the one or more plants as infected or not infected based at least in part on the identified damage amount; and
generating an efficacy rate of the agricultural application based on a ratio of the one or more plants categorized as infected and not infected;
update a vehicle control learning algorithm for controlling the agricultural vehicle based on the determined quality of the agricultural application; and
control an operation of the agricultural vehicle based on the updated vehicle control learning algorithm.

9. The non-transitory computer-readable media of claim 8, wherein the one or more sensors includes an object identification sensor.

10. The non-transitory computer-readable media of claim 9, wherein the object identification sensor comprises an object identification software which is configured to determine the identification of the one or more plants in the agricultural field.

11. The non-transitory computer-readable media of claim 10, wherein the agricultural application is a pesticide application.

12. The non-transitory computer-readable media of claim 10, wherein the agricultural application is a herbicide application and wherein the processor further executes the computer-readable instructions to:
categorize the one or more plants as either a crop or a non-crop; and
generate an herbicide efficacy rate of the herbicide application based on a second ratio of the one or more plants categorized as the crop and the one or more plants categorized as the non-crop.

13. The non-transitory computer-readable media of claim 8, wherein the vehicle control learning algorithm is at least one of an artificial intelligence algorithm, a reinforcement learning algorithm, and a machine learning algorithm.

14. The non-transitory computer-readable media of claim 8, wherein the one or more sensors is at least one of a camera, a radar sensor, and a radio frequency identification sensor.

15. A vehicle control system comprising:
an agricultural vehicle;
an implement coupled to the agricultural vehicle; and
a controller comprising one or more processing circuits, each processing circuit including a processor and a memory, the memory having instructions stored thereon that, when executed by the processor, cause the one or more processing circuits to:
receive sensor information for the agricultural vehicle from one or more sensors, the sensor information associated with one or more plants in an agricultural field;
determine a quality of an agricultural application based on the sensor information by:
identifying the one or more plants in the agricultural field and a damage amount of the identified one or more plants;
categorizing the one or more plants as infected or not infected based at least in part on the identified damage amount; and
generating an efficacy rate of the agricultural application based on a ratio of the one or more plants categorized as infected and not infected;
update a vehicle control learning algorithm for controlling the agricultural vehicle based on the determined quality of the agricultural application; and
control an operation of the agricultural vehicle based on the updated vehicle control learning algorithm.

16. The vehicle control system of claim 15, wherein the one or more sensors includes an object identification sensor.

17. The vehicle control system of claim 16, wherein the object identification sensor comprises an object identification software which is configured to determine the identification of the one or more plants in the agricultural field.

18. The vehicle control system of claim 17, wherein the agricultural application is a pesticide application.

19. The vehicle control system of claim 17, wherein the agricultural application is a herbicide application and wherein the processor further executes the instructions to:
categorize the one or more plants as either a crop or a non-crop; and
generate an herbicide efficacy rate of the herbicide application based on a second ratio of the one or more plants categorized as the crop and the one or more plants categorized as the non-crop.

20. The vehicle control system of claim 15, wherein the vehicle control learning algorithm is at least one of an artificial intelligence algorithm, a reinforcement learning algorithm, and a machine learning algorithm.

\* \* \* \* \*